(12) United States Patent
Partridge et al.

(10) Patent No.: US 8,078,152 B2
(45) Date of Patent: Dec. 13, 2011

(54) VENUE INFERENCE USING DATA SENSED BY MOBILE DEVICES

(75) Inventors: Kurt E. Partridge, Palo Alto, CA (US); Maurice K. Chu, Burlingame, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 173 days.

(21) Appl. No.: 12/540,597

(22) Filed: Aug. 13, 2009

(65) Prior Publication Data

US 2011/0039522 A1 Feb. 17, 2011

(51) Int. Cl.
*H04M 11/10* (2006.01)
*H04W 24/00* (2009.01)

(52) U.S. Cl. .................... 455/414.1; 455/456.3

(58) Field of Classification Search .............. 455/456.3, 455/414.1, 414.2, 405, 456.5, 556.1, 457, 455/420, 533.1, 418, 419, 558, 575.2, 404.1, 455/404.2, 421, 422.1, 427, 12.1; 701/117, 701/2, 300; 726/4; 370/474; 382/305, 306; 705/10

See application file for complete search history.

(56) References Cited

U.S. PATENT DOCUMENTS

| | | | | |
|---|---|---|---|---|
| 6,013,007 A | * | 1/2000 | Root et al. | 482/8 |
| 6,060,038 A | * | 5/2000 | Burns et al. | 424/1.81 |
| 6,148,262 A | * | 11/2000 | Fry | 701/213 |
| 6,522,266 B1 | * | 2/2003 | Soehren et al. | 340/988 |
| 6,837,827 B1 | * | 1/2005 | Lee et al. | 482/8 |
| 7,786,991 B2 | * | 8/2010 | Reshetov et al. | 345/420 |
| 7,811,203 B2 | * | 10/2010 | Unuma et al. | 482/8 |
| 2004/0204038 A1 | * | 10/2004 | Suzuki et al. | 455/553.1 |
| 2005/0054337 A1 | * | 3/2005 | Nobusawa et al. | 455/420 |
| 2008/0001773 A1 | * | 1/2008 | Rye et al. | 340/825.22 |
| 2010/0183246 A1 | * | 7/2010 | King et al. | 382/305 |
| 2011/0022443 A1 | * | 1/2011 | Partridge et al. | 705/10 |
| 2011/0125678 A1 | * | 5/2011 | Partridge | 706/12 |

OTHER PUBLICATIONS

Ofstad, Andrew et al., "AAMPL: Accelerometer Augmented Mobile Phone Localization", MELT '08, Sep. 19, 2008, San Francisco, CA.
Azizyan, Martin et al., "SurroundSense: Mobile Phone Localization Using Ambient Sound and Light".
Yanfeng, Zhu et al.,"Trajectory enabled service support platform for mobile users' behavior pattern mining", Mobile and Ubiquitous Systems: Networking & Services, Mobiquitous, 2009, pp. 1-10.

\* cited by examiner

*Primary Examiner* — Melody Mehrpour
(74) *Attorney, Agent, or Firm* — Shun Yao; Park, Vaughan, Fleming & Dowler LLP

(57) ABSTRACT

One embodiment of the present invention provides a system for determining venue information associated with a mobile device user. During operation, the system collects contextual information recorded by one or more sensors located on the mobile device and extracts a behavior pattern of the user as a function of time and/or an environmental indicator based on the collected contextual information. The system then compares the behavior pattern and/or the environmental indicator with known behavior patterns and/or environmental indicators associated with a number of venues stored in a database, and determines a venue associated with the user based at least on the comparison.

20 Claims, 4 Drawing Sheets

VENUE INFERENCE USING DATA SENSED BY MOBILE DEVICES

BACKGROUND

1. Field

This disclosure is generally related to venue inference. More specifically, this disclosure is related to identification of venues based at least on various data sensed by a mobile device.

2. Related Art

Accurate information regarding a person's location at a given time has become essential to many mobile applications. For example, a WiFi hot-spot detection application may need to determine a user's current location in order to provide the user information regarding a nearest WiFi hot spot. A user may receive a specific advertisement on his mobile phone based on various venues he has visited. Therefore, it is important to determine a user's location, particularly his location relative to a specific venue, such as a restaurant or a theater. For example, if it is determined that the user is inside a movie theater, a mobile phone application may instruct the mobile phone to enter a silence mode automatically.

Existing positioning systems often cannot provide sufficient accuracy in determining the location of a person, especially in determining the specific venue that person is in. To locate a person, existing technologies typically rely on a Global-Positioning-System (GPS) receiver equipped by a mobile device carried by the person. However, GPS-based positioning can be problematic inside buildings, such as indoor shopping malls, and in so called "urban canyons" (downtown areas surrounded by skyscrapers). Due to weakened signal strength, GPS location errors increase when a user is in an indoor environment. Other positioning systems that utilize WiFi access points or GSM (Global System for Mobile communications) traces also suffer from low accuracy in determining the venue a person is in.

SUMMARY

One embodiment of the present invention provides a system for determining venue information associated with a mobile device user. During operation, the system collects contextual information recorded by one or more sensors located on the mobile device and extracts a behavior pattern of the user as a function of time and/or an environmental indicator based on the collected contextual information. The system then compares the behavior pattern and/or the environmental indicator with known behavior patterns and/or environmental indicators associated with a number of venues stored in a database, and determines a venue associated with the user based at least on the comparison.

In a variation on this embodiment, the system determines an approximate location of the user and identifies a number of venues associated with the approximate location, thereby facilitating the determination of the venue associated with the user.

In a variation on this embodiment, the system extracts the user's behavior pattern as a function of time based on outputs of the one or more sensors.

In a further variation, the user's behavior pattern includes the user's physical motion pattern.

In a further variation, the user's physical motion pattern includes at least one of: a sequence of physical motions and a duration of a physical motion.

In a variation on this embodiment, the system determines whether the user is inside the venue based on an accuracy indicator of a location-sensing mechanism.

In a variation on this embodiment, the system determines a time duration for which the user is expected to stay at the venue.

In a variation on this embodiment, the one or more sensors include at least one of: location-sensing mechanism, an accelerometer, a clock, a microphone, a light sensor, a camera, a gyroscope, and a magnetometer.

BRIEF DESCRIPTION OF THE FIGURES

In the figures, like reference numerals refer to the same figure elements.

DETAILED DESCRIPTION

Figure 1:
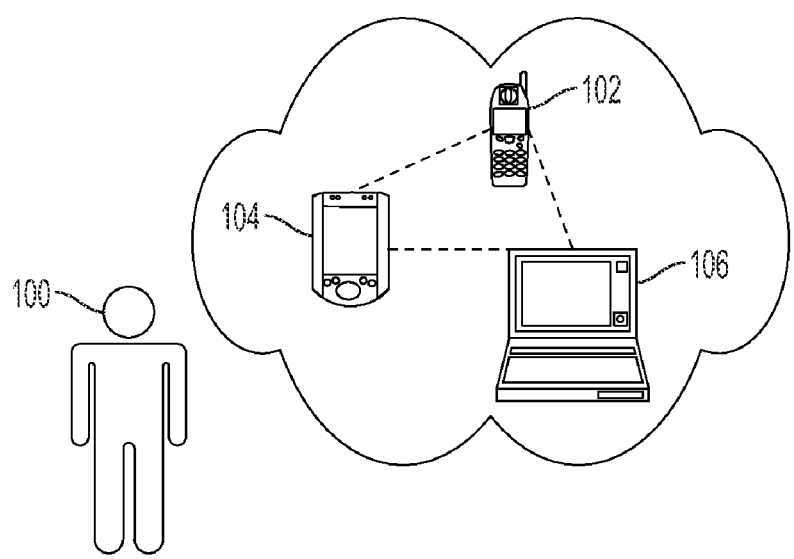
FIG. 1 presents a diagram illustrating a user carrying one or more mobile devices.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

OVERVIEW

Embodiments of the present invention provide a system for locating a user carrying a mobile device. During operation, the system collects contextual information from various sensor components located on the mobile device. In addition, the system analyzes collected information in order to extract the user's behavior information and information about the user's surroundings. The system then determines the venue the user is in based on the extracted information regarding the user's behavior and surroundings.

VENUE INFERENCE

As GPS technologies continue to mature, an increasing number of mobile devices, such as mobile phones, personal digital assistants (PDA), and laptop computers, are equipped with GPS receivers making it easier to locate the mobile device. However, GPS-based positioning systems have been shown to be less accurate and work poorly in an indoor environment. In addition, GPS coordinates alone often do not provide sufficient information for determining the venue information associated with the user. For example, when a user of a GPS-equipped mobile phone enters an indoor shopping mall, based on the obtained GPS coordinates from the GPS receiver, a remote server can determine that the user is inside the shopping mall. However, due to the poor signal strength inside the shopping mall, the locating error of the GPS may increase to tens of meters, making it impossible for the remote server to obtain the precise location of the user, such as exact stores he visits.

Even if the GPS-based system can improve its indoor accuracy to within a few meters, it may still be difficult to pinpoint the exact location of a user due to the proximity of two adjacent venues. Such venue-ambiguity may be problematic to corresponding mobile applications. In many cases, two venues serving distinctively different purposes may share the same wall, or one smaller venue may be a subsection of a larger venue, thus making it difficult for the GPS-based system to detect the specific venue a user is in. For example, in an urban shopping center, a comic book store is located right next to an upscale restaurant. A mobile advertising company may want to send different advertisements to users entering these two different venues. The ability to distinguish the type of the venue, or to pinpoint the exact venue a user has visited is valuable to location-based services. To determine a user's location relative to a venue, embodiments of the present invention collect and analyze various types of contextual information in addition to GPS data. Note that in this disclosure, the term "venue" refers to a location that people can conduct certain activities. Examples of a venue include, but are not limited to: a store, a restaurant, a theater, a sport arena, a factory, and an office building.

FIG. 1 presents a diagram illustrating a user 100 carrying one or more mobile devices, including but not limited to: a mobile phone 102, a personal digital assistant (PDA) 104, and a laptop computer 106. Each mobile device is equipped with a number of sensors that can be used to collect contextual information.

Figure 2:
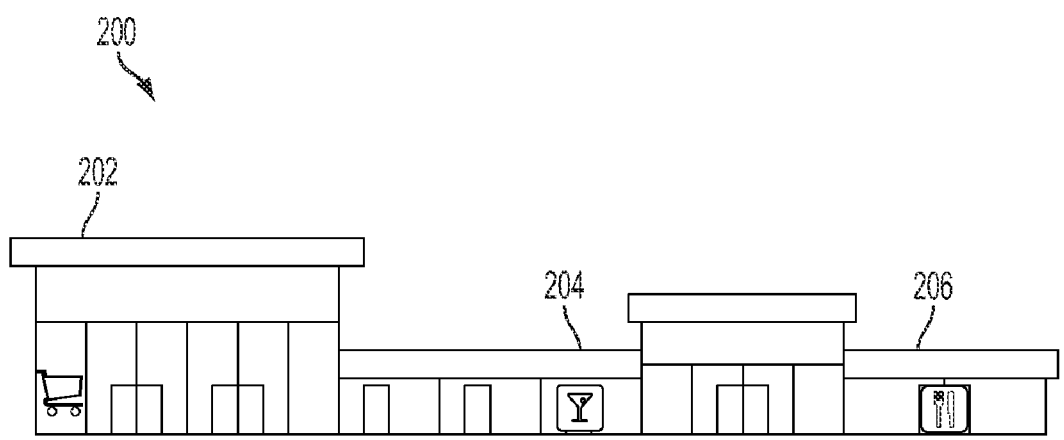
FIG. 2 presents a diagram illustrating the layout of a shopping mall, which includes a number of venues.

FIG. 2 presents a diagram illustrating the layout of a shopping mall 200. Shopping mall 200 includes a grocery store 202, a bar 204, and a restaurant 206. A user carrying a mobile device such as a mobile phone may wander in shopping mall 200 for an extended time period. In particular, the user may enter grocery store 202 and spend half an hour shopping for groceries. The user may enter restaurant 206 and spend an hour eating dinner. The user may also enter bar 204 and spend two hours socializing with friends. In order to determine the user's venue at a given time, the mobile phone carried by the user collects contextual information and sends such information to a remote server, which in turn analyzes such information to infer a corresponding venue for the user.

Figure 3:
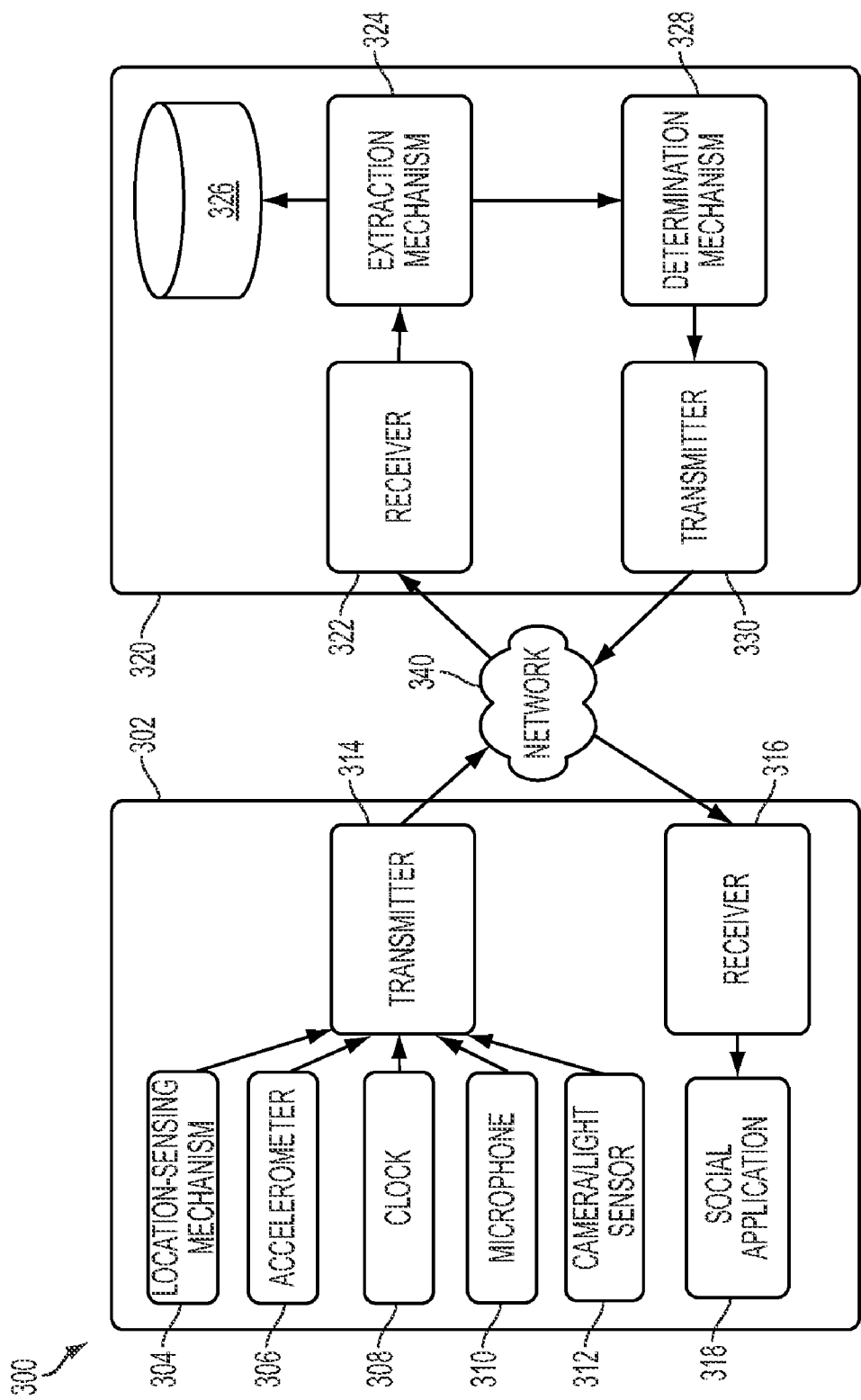
FIG. 3 presents a block diagram illustrating an exemplary architecture of a venue-inference system in accordance with an embodiment of the present invention.

FIG. 3 presents a block diagram illustrating an exemplary architecture of a venue-inference system in accordance with an embodiment of the present invention. Venue detection system 300 includes a mobile computing device 302, a remote server 320, and a network 340. Mobile computing device 302 can be any portable device with computational capability. Examples of mobile computing device 302 include, but are not limited to: a mobile phone, a PDA, and a laptop computer. Network 340 may correspond to any type of wired or wireless communication channel capable of coupling together computing nodes (e.g., mobile computing device 302 and remote server 320). Remote server 320 may correspond to a node on the network that can provide a service to mobile device 302. For example, remote server 320 can provide a venue-inference service to mobile device 302.

Mobile device 302 can include a number of sensors, including a location-sensing mechanism 304 (e.g., a GPS receiver), an accelerometer 306, a clock 308, a microphone 310, and a camera/light sensor 312. Other types of sensors, such as gyroscope and magnetometer, can also be included. In addition, mobile device 302 can include a transmitter 314, a receiver 316, and a social application 318. In one embodiment, the sensors collect various types of contextual data, and send such data to transmitter 314, which in turn transmits the collected contextual data to remote server 320 via network 340. In one embodiment, location-sensing mechanism includes a GPS receiver.

Remote server 320 includes a receiver 322, an extraction mechanism 324, a database 326, a determination mechanism 328, and a transmitter 330. In one embodiment, receiver 322 receives collected contextual information and sends such information to extraction mechanism 324. Extraction mechanism 324 extracts information regarding the user's behavior and current surroundings, and compares such information with known behavior/surroundings-venue mappings stored in database 326. In one embodiment, the user's behavior can be the user's physical movement, such as sitting, standing, walking, and running. Determination mechanism 328 determines the user's venue based on the extracted information and the comparison result. Transmitter 330 transmits the venue information back to mobile device 302 via network 340. Receiver 316 on mobile device 302 receives the transmitted venue information and feeds such information to social application 318. Social application 318 can be a venue-based application, such as an indoor people-finder application or a mobile advertisement application.

Note that in some embodiments, instead of sending contextual information to a remote server for venue determination, the mobile device can analyze the collected contextual information directly. In such an embodiment, the extraction mechanism, the database, and the determination mechanism are located on the mobile device instead of a remote server.

Now referring to both FIGS. 2 and 3, location-sensing mechanism 304 on mobile device 302 receives location information such as GPS signals. With accuracy in the range of tens of meters, when combined with a map (either stored in mobile device 302 or accessed from remote server 320), the received GPS signals can provide an approximate location of mobile device 302, thus an approximate location of the user carrying mobile device 302. Consequently, the system is able to determine a number of venues that the user may be in around that approximate location. For example, the GPS signals can be used to determine that the user is in shopping mall 200, which includes a number of venues, such as grocery store 202, bar 204, and restaurant 206. To pinpoint the user's location to a particular store or venue within shopping mall 200, additional information collected from other sensor devices is used.

In one embodiment, clock 308 can provide timing information, such as time of day, which can be used by determination mechanism 328 to determine a venue for the user. For example, in one scenario, clock 308 indicates that the current time is 8 am. Because bar 204 and restaurant 206 are not open at 8 am, determination mechanism 328 can determine that mobile device 302, thus the user, is in grocery store 202.

In one embodiment, accelerometer 306 records an accelerometer trace. Assuming that the user carries mobile device 302 close to his body, such as in a pocket, the recorded accelerometer trace can be used to derive the user's movements. For example, accelerometer 306 can detect the user's current motion status, such as walking, running, or standing still. To determine a walking or running pattern, the system compares the energy level at typical walking or running movement frequencies to the energy level at other frequencies, such as standing or sitting. If such energy level is sufficiently high, the user is likely to be engaged in one of these two activities. In addition, accelerometer 306 can also detect whether the user is sitting or standing based on the accelerometer angle. In one scenario, accelerometer 306 detects that the user is walking Such a behavior is more likely to happen in a grocery store instead of a bar or a restaurant, where people tend to sit. Consequently, determination mechanism 328 determines that the user is in grocery store 203. In addition to walking or running, accelerometer 306 can also detect whether the user is climbing stairs or turning corners. Such additional information can help locate the user within a store. For example, turning corners may indicate that the user is at the end of an aisle. In addition to accelerometer 306, a gyroscope or a magnetometer can also be used to determine whether the user is climbing stairs or turning corners.

In addition to instantaneous user behavior, the system can also derive a user's behavior pattern as a function of time based on a sequence of collected data. For example, when combined with timing information, a sequence of accelerometer traces recorded by accelerometer 306 can be used to extract a user's physical motion pattern as a function of time. In one scenario, based on a sequence of accelerometer traces and their corresponding timing data, extraction mechanism 324 extracts a user motion pattern as standing briefly, sitting for a short while (such as five minutes), walking briefly, sitting for a relatively long period of time (such as forty-five minutes), walking again. Because such a motion pattern often corresponds to that of a patron in a restaurant (he may first stand, then sit while waiting for the maître d', then walk to his seat and sit while eating, and finally leave without stopping), determination mechanism 328 can determine that the user is in restaurant 206. Similarly, if extraction mechanism 324 extracts a user's behavior as walking with occasional pauses and turns (going up and down aisles) followed by standing briefly (paying), and walking with no pause (leaving), determination mechanism 328 can determine that the user is most likely to be in grocery store 202.

In order to extract such user behavior pattern associated with a venue, the system ideally determines when a user enters and exits a venue. To determine that a user is inside a venue (or enters a venue), the system can check an accuracy figure of location sensing mechanism 304. In one embodiment, the system checks the dilution of precision (DOP) value including the HDOP (horizontal-DOP) value and the VDOP (vertical-DOP) value of a GPS receiver. For example, when the GPS receiver reports its DOP value increases indicating its accuracy is lowered, remote server 320 can then determine that the user carrying mobile device 302 has just entered a venue. Similarly, if the GPS receiver reports its DOP value decreases indicating an enhanced accuracy, remote server 320 can determine that the user has just exited a venue. Once the system determines a time the user enters a venue and a time the user exits a venue, the system is able to deduct a time period the user spent inside the venue.

In some embodiments, camera/light sensor 312 can take pictures automatically. Information that can be used to infer a venue can be extracted (such as via pattern recognition) from these pictures. For example, if a picture taken by camera/light sensor 312 shows a dim background, it is more likely that the user is in bar 204 instead of grocery store 202. Note that an automatically taken picture is only likely to be of value if the camera is pointed at something in the environment. Such a picture will be less useful if it is taken inside the user's pocket or purse. On the other hand, when a user is making a phone call by holding a mobile phone to his ear, an out-facing camera can have an unobstructed view of the surroundings. In one embodiment, camera/light sensor 312 is programmed to detect a likely time to take a picture, such as during a phone call, or when surrounding lighting is sufficient. To prevent the intrusion to a user's privacy, the automatically taken pictures will not be stored permanently. They can be discarded once necessary computations of relevant statistics are performed.

In a further embodiment, microphone 310 located on mobile device 302 collects ambient sounds in the environment. Because different venues often have different ambient sound levels, such information can be used in venue detection. For example, if microphone 310 records a relatively loud ambient sound level, the user is more likely to be in bar 204 instead of restaurant 206. In addition to sound level, echo characteristics can also be used in venue detection because different types of walls may exhibit different echo characteristics. For example, walls of concert halls and basketball arenas may have significantly different echo characteristics. Moreover, for a particular venue, a distinct ambient sound pattern can be extracted using pattern-recognition techniques. The venue-related ambient sound patterns can be stored in database 326. Determination mechanism 328 can then map an ambient sound pattern detected by microphone 310 to one of the sound patterns stored in database 326, and use the mapping result to infer venue. In one embodiment, the system determines the user entering and exiting a venue based on the abrupt change in ambient sound levels.

In addition to sound patterns, database 326 can also store other patterns associated with a particular venue, such as user behavior patterns, lighting patterns, picture patterns, and their combinations. For example, customers in a grocery store are expected to stop and pay before they walk a certain number of steps to leave the store, customers in a fast food restaurant are expected to sit for a short amount of time to eat, and customers in a fine dining place are expected to sit for a prolonged period while eating. Such user behavior patterns can be saved as known behavior patterns in database 326. Additional examples include picture patterns that may show the sign of a venue or distinct decorations associated with a particular venue, and lighting patterns (dim, bright, and color tones). All these environmental data recorded by the various sensors can be used to extract information regarding the venue a user is in. Such information can be referred to as environmental indicators. In one embodiment, the system infers a venue based on both the extracted user behavior information and the environmental indicator.

The contents of database 326 can be collected by paid labor that collects various sensor data for particular venues. Alternatively, mobile device users are encouraged to "tag" their daily activities, thus effectively associating their sensor data with particular venues. In one embodiment, remote server 320 queries the user of mobile device 302 for venue information corresponding to data sensed by mobile device 302 and stores such information in database 326. In further embodiments, mobile device users can upload their sensor data, such as pictures and sound, without associating (labeling) it with a particular venue. In such cases, labeling of such data can be performed by other paid or unpaid labor. For example, Amazon Mechanical Turk (a web service provided by Amazon.com Inc. of Seattle, Wash.) workers, or individuals playing games such as Luis von Ahn's "Games with a Purpose" can recognize and label such data. In addition, semi-supervised learning approaches are also possible, in which only some of the sensed data are labeled, but the labeled and unlabeled data are both used to determine the label of a new test venue.

In addition to storing data sequences known to be associated with a particular venue in database 326, in one embodiment the system abstracts several such sequences into a pattern, based on for example a hidden Markov model. When a new data sequence is detected, it can be compared to all models associated with possible venues to determine which one is most likely. Furthermore, the system can associate the current time with a particular time point of the abstract model, and use such information to predict an expect time duration for which a user may stay at the venue. For example, based on the abstract behavior model of a restaurant customer, the system can identify a particular time point, at which he sits down to eat at his table. With such a particular time identified, the system can determine, for example, the expected time duration for which the user may remain in the restaurant. The expected time duration that a user may stay in a venue can be obtained by the averaging the time of stay of a number of users.

Figure 4:
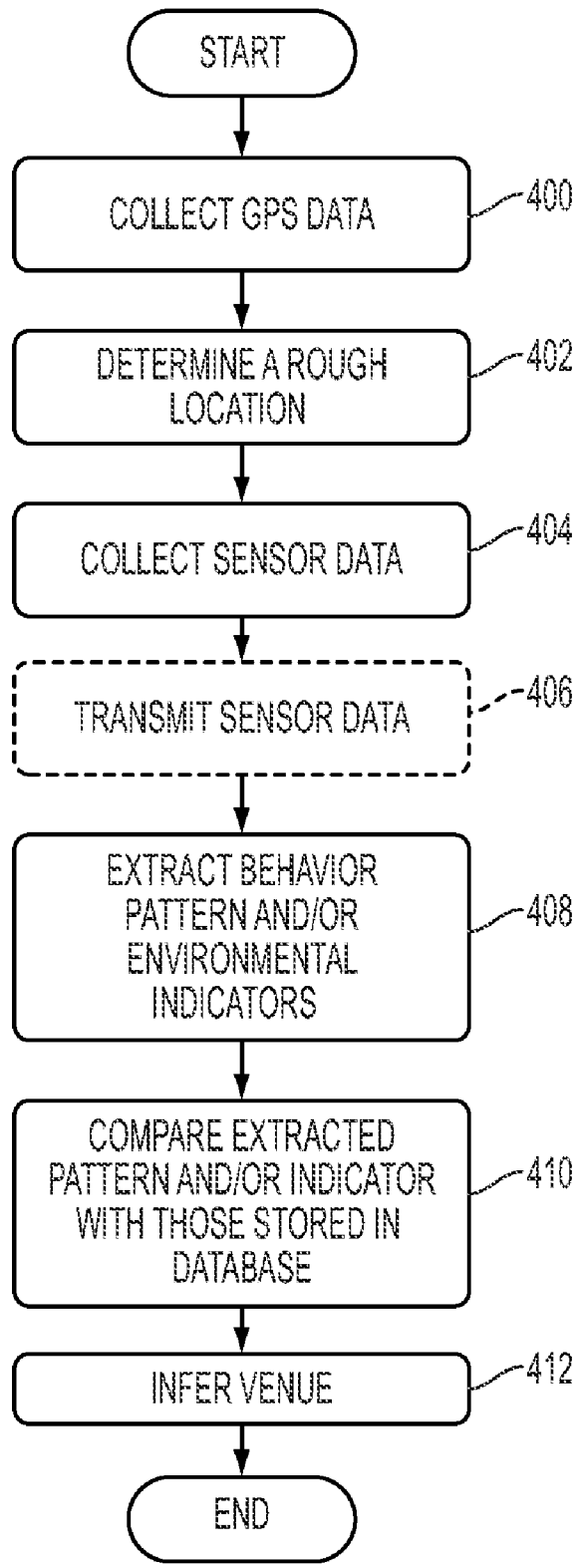
FIG. 4 presents a flow chart illustrating the process of detecting the venue associated with a user carrying a mobile device in accordance with an embodiment of the present invention.

FIG. 4 presents a flow chart illustrating the process of inferring the venue associated with a user carrying a mobile device in accordance with an embodiment of the present invention. During operation, the system first collects location data from a location-sensing mechanism located on the mobile device (operation 400) and determines an approximate location of the user, such as a city block (operation 402). In one embodiment, the system determines the user's approximate location based on received GPS data and a map stored in the mobile device. Subsequently, the system collects additional sensor data such as current time, accelerometer traces, pictures taken automatically, ambient lighting, and ambient sound (operation 404). The system optionally transmits collected sensor data to a remote server (operation 406). In one embodiment, the sensor data computation and analysis are performed by the mobile device instead of by a remote server. Based on the additional sensor data, the system extracts the user's behavior pattern as a function of time and possible environmental indicators (operation 408). Because environmental indicators are often extracted from pictures, lighting, and sound, if the user's mobile device is kept inside a pocket or a purse, it may be difficult to extract meaningful environmental indicators. Thus, in one embodiment, the system can rely only on the user's behavior pattern to infer the venue. The system compares extracted user behavior patterns and/or environmental indicators with known pattern-venue mappings and/or environmental indicator-venue mappings stored in a database (operation 410), and infers the venue the user is in (operation 412). Note that because the system has already determined an approximate location of the user, instead of searching the whole database for matching patterns, the system can use the location information to limit the search to data patterns only associated with venues in the vicinity of the determined location. As a result, the search can be more efficient and accurate.

Figure 5:
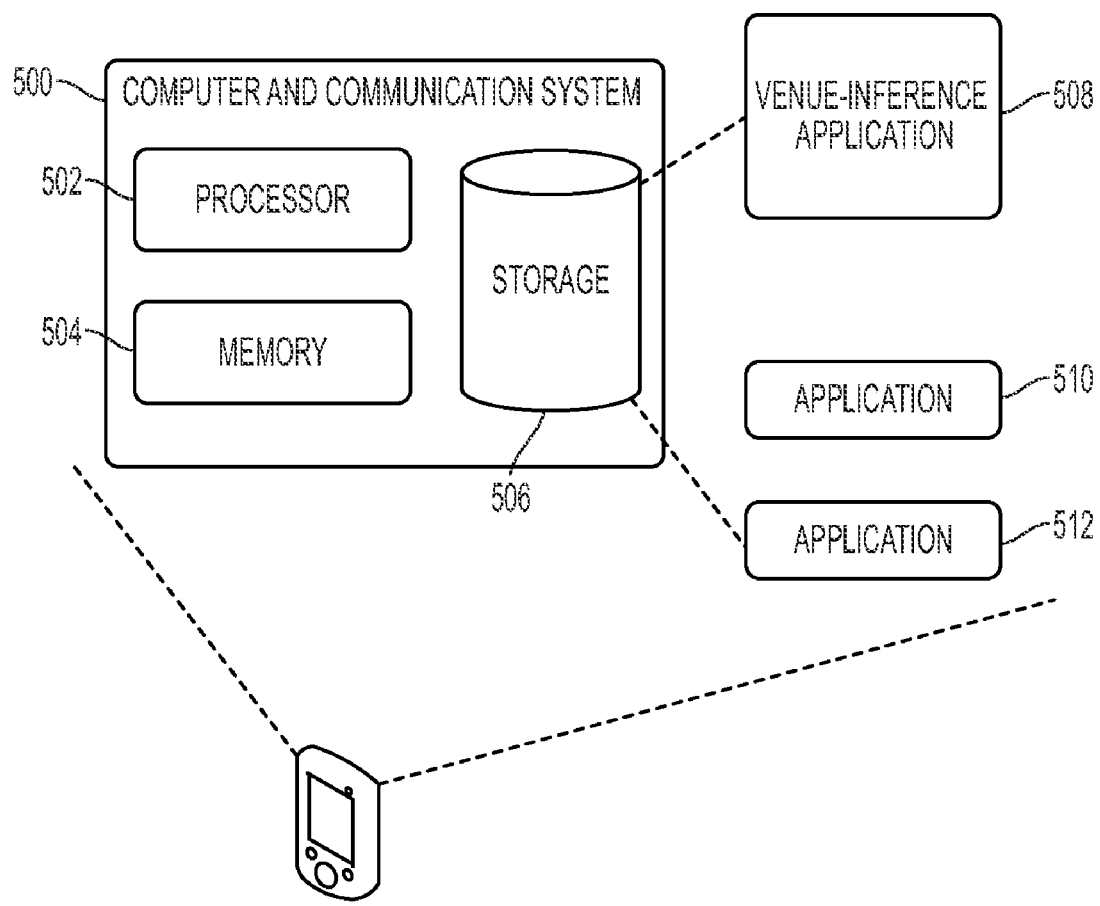
FIG. 5 illustrates an exemplary computer system for detecting the venue associated with a user in accordance with one embodiment of the present invention.

FIG. 5 illustrates an exemplary computer system for detecting the venue associated with a user in accordance with one embodiment of the present invention. In one embodiment, a computer and communication system 500 includes a processor 502, a memory 504, and a storage device 506. Storage device 506 stores a venue-inference application 508, as well as other applications, such as applications 510 and 512. In one embodiment, venue-inference application 508 further includes a program that facilitates the detection of the venue using one or more of the aforementioned methods. During operation, venue-inference application 508 is loaded from storage device 506 into memory 504 and then executed by processor 502. While executing the program, processor 502 performs the aforementioned functions.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for determining venue information associated with a mobile device user, the method comprising:
   collecting contextual information recorded by plurality of sensors located on the mobile device, wherein the sensors include a global positioning system (GPS) sensor;
   extracting a behavior pattern of the user as a function of time and/or an environmental indicator based at least on the collected contextual information;
   comparing the behavior pattern and/or the environmental indicator with known behavior patterns and/or environmental indicators associated with a number of venues stored in a database;
   determining a venue associated with the user based at least on the comparison; and
   determining whether the user enters and/or exits the venue based on a dilution of precision (DOP) value of the GPS sensor.

2. The method of claim 1, further comprising:
   determining an approximate location of the user; and
   identifying a number of venues associated with the approximate location, thereby facilitating the determination of the venue associated with the user.

3. The method of claim 1, wherein the user's behavior pattern as a function of time is extracted based on outputs of the one or more sensors.

4. The method of claim 3, wherein the user's behavior pattern comprises the user's physical motion pattern.

5. The method of claim 4, wherein the user's physical motion pattern comprises at least one of:
   a sequence of physical motions; and
   a duration of a physical motion.

6. The method of claim 1, further comprising determining a time duration for which the user is expected to stay in the venue.

7. The method of claim 1, wherein the sensors comprise at least one of:
- an accelerometer;
- a clock;
- a microphone;
- a light sensor;
- a camera;
- a gyroscope; and
- a magnetometer.

8. A system for determining venue information associated with a mobile device user, comprising:
- a plurality of sensors for collecting contextual information, wherein the sensors include a global positioning system (GPS) sensor;
- an extraction mechanism configured to extract a behavior pattern of the user as a function of time and/or an environmental indicator based at least on the collected contextual information;
- a database storing known user behavior patterns and/or environmental indicators associated with a number of venues; and
- a determination mechanism configured to determine a venue associated with the user based at least on a comparison between the extracted behavior pattern and/or environmental indicator and the ones stored in the database,. wherein the determination mechanism is further configured to determine whether the user enters and/or exits the venue based on a dilution of precision (DOP) value of the GPS sensor.

9. The system of claim 8, further comprising:
- a second determining mechanism configured to determine an approximate location of the user; and
- an identification mechanism configured to identify a number of venues associated with the approximate location, thereby facilitating the determination of the venue associated with the user.

10. The system of claim 8, wherein while extracting the behavior pattern, the extraction mechanism is configured to extract the user's behavior pattern as a function of time based on outputs of the one or more sensors.

11. The system of claim 10, wherein the user's behavior pattern comprises the user's physical motion pattern.

12. The system of claim 11, wherein the user's physical motion pattern comprises at least one of:
- a sequence of physical motions; and
- a duration of a physical motion.

13. The system of claim 8, wherein the determination mechanism is further configured to determine a time duration for which the user is expected to stay in the venue.

14. The system of claim 8, wherein the one or more sensors comprise at least one of:
- an accelerometer;
- a clock;
- a microphone;
- a light sensor;
- a camera;
- a gyroscope; and
- a magnetometer.

15. A server facilitating determination of venue information associated with a mobile device user, comprising:
- a receiving mechanism configured to receive contextual information recorded by a plurality of sensors located on the mobile device wherein the sensors include a global positioning system (GPS) sensor;
- an extraction mechanism configured to extract a behavior pattern of the user as a function of time and/or an environmental indicator based at least on the collected contextual information;
- a database storing known user behavior patterns and/or environmental indicators associated with a number of venues; and
- a determination mechanism configured to determine a venue associated with the user based at least on a comparison between the extracted behavior pattern and/or environmental indicator and the ones stored in the database, wherein the determination mechanism is further configured to determine whether the user enters and/or exits the venue based on a dilution of precision (DOP) value of the GPS sensor.

16. The server of claim 15, further comprising:
- a second determining mechanism configured to determine an approximate location of the user; and
- an identification mechanism configured to identify a number of venues associated with the approximate location, thereby facilitating the determination of the venue associated with the user.

17. The server of claim 15, wherein while extracting the behavior pattern, the extraction mechanism is configured to extract the user's behavior pattern as a function of time based on outputs of the one or more sensors.

18. The server of claim 17, wherein the user's behavior pattern comprises the user's physical motion pattern.

19. The server of claim 18, wherein the user's physical motion pattern comprises at least one of:
- a sequence of physical motions; and
- a duration of a physical motion.

20. The server of claim 15, wherein the determination mechanism is further configured to determine a time duration for which the user is expected to stay in the venue.

* * * * *